United States Patent [19]

Fitch, Jr.

[11] Patent Number: 5,171,367
[45] Date of Patent: Dec. 15, 1992

[54] APPARATUS FOR APPLYING SAUCE TO A PIZZA

[76] Inventor: Clifford E. Fitch, Jr., R.R. #2 - Box 74C, Beecher, Ill. 60401

[21] Appl. No.: 642,387

[22] Filed: Jan. 17, 1991

[51] Int. Cl.⁵ .............................................. B05C 5/00
[52] U.S. Cl. ..................................... 118/25; 222/380; 222/385; 222/486
[58] Field of Search .................. 222/380, 385, 400 S, 222/401, 486, 494, 561, 565; 118/25

[56] References Cited

U.S. PATENT DOCUMENTS

| | | | |
|---|---|---|---|
| 339,295 | 4/1886 | Hugentobler | 222/400.5 |
| 2,494,147 | 1/1950 | Trelease et al. | 222/400.5 |
| 2,837,246 | 6/1958 | Steele | 222/385 |
| 3,227,320 | 1/1966 | Minder et al. | 222/385 |
| 3,372,843 | 3/1968 | Soodalter | 222/380 |
| 3,908,584 | 9/1975 | Raque | 118/25 |
| 4,088,249 | 5/1978 | Westling | 222/486 |
| 4,143,688 | 3/1979 | Gill, Jr. et al. | 222/486 |
| 4,145,990 | 3/1979 | Hochandel et al. | 118/25 |
| 4,256,242 | 3/1981 | Christine | 222/494 |
| 4,566,506 | 1/1986 | Cramer et al. | 118/25 |
| 4,771,726 | 9/1988 | Fitch, Jr. | 222/380 |
| 4,801,097 | 1/1989 | Fitch, Jr. | 222/262 |
| 4,869,404 | 9/1989 | Elliott | 222/380 |

Primary Examiner—Robert P. Olszewski
Assistant Examiner—Steven M. Reiss
Attorney, Agent, or Firm—Wallenstein, Wagner & Hattis, Ltd.

[57] ABSTRACT

An apparatus for applying a flowable material, such as a pizza sauce, onto an object, such as a pizza shell, is disclosed. The apparatus comprises a source of the flowable material having a source outlet port and a chamber having an chamber inlet port and a chamber outlet port. The apparatus further includes a piston and cylinder for moving the flowable material from the source to the chamber and a flow control gate disposed at the chamber outlet port. The apparatus further includes an arm responsive to actuation of the piston for opening the flow control gate, thereby permitting a substantially uniform application of the flowable material onto the object.

23 Claims, 7 Drawing Sheets

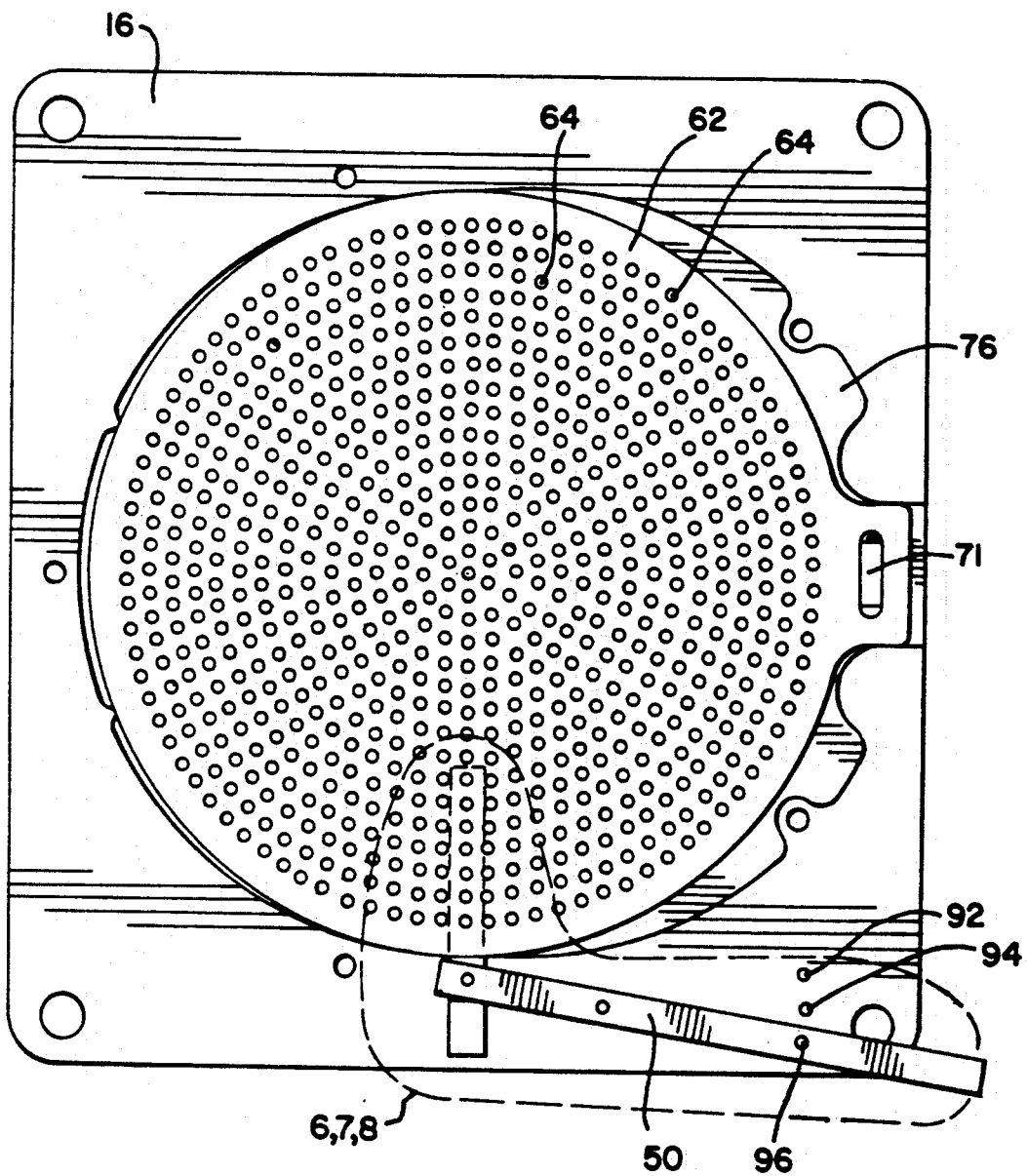

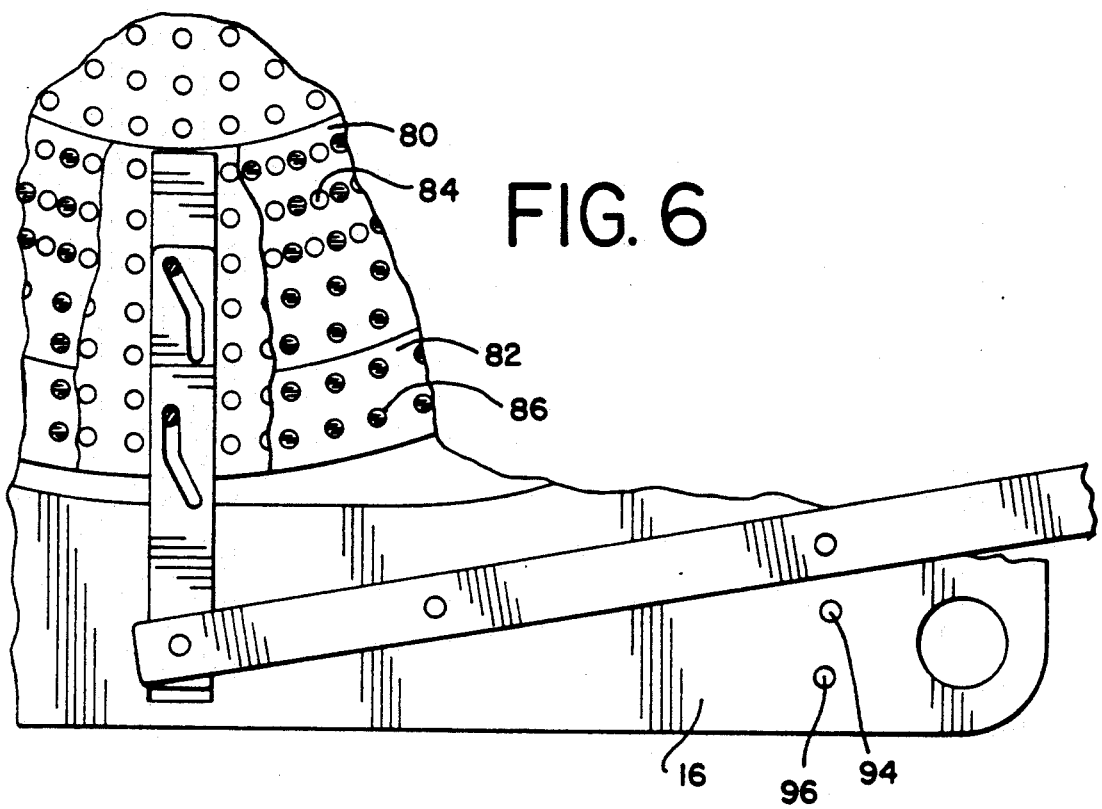
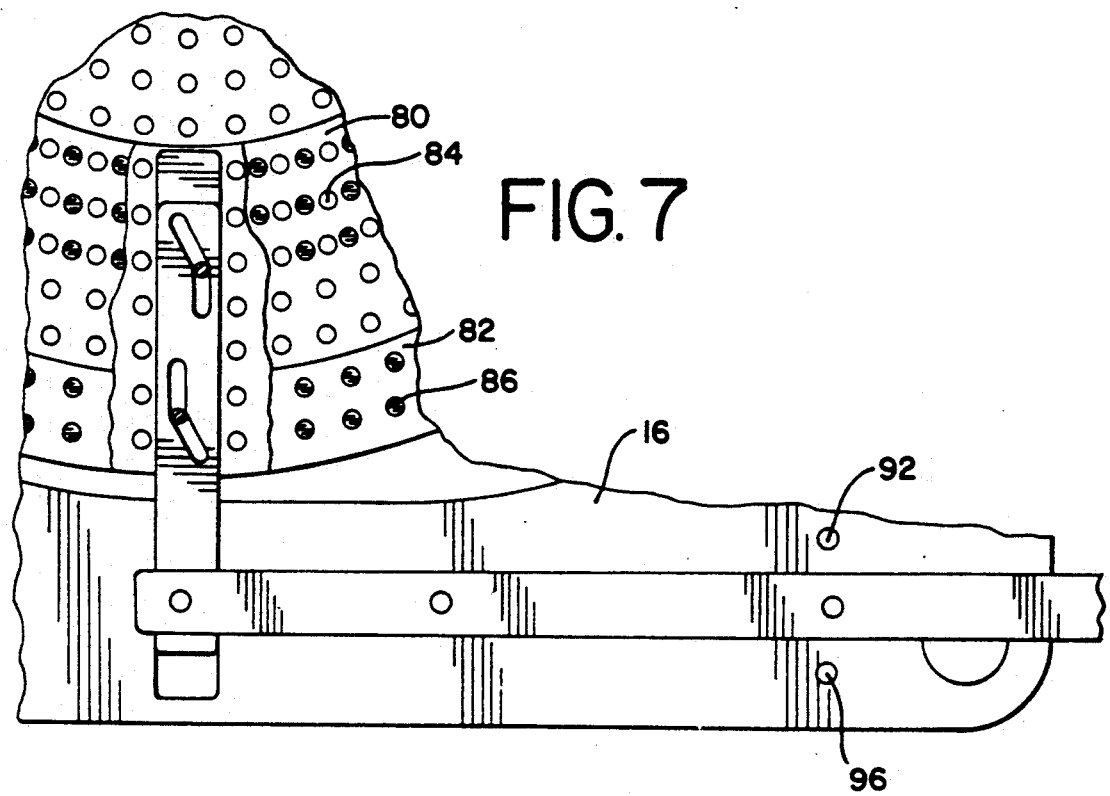

APPARATUS FOR APPLYING SAUCE TO A PIZZA

DESCRIPTION

1. Technical Field

Applicant's invention relates to pizza making and, more particularly, to an apparatus for applying pizza sauce to individual pizza shells, such as at a high volume pizza parlor.

2. Background Prior Art

Many of today's pizza parlors, especially those concentrating in pizza delivery, produce a tremendous number of pizzas of various sizes, such as small, medium and large. Labor is a significant one of the costs involved in making these pizzas. Due to the highly competitive nature of such establishments, the pizzas must be made consistent and costs must be kept to a minimum. One way to make the pizzas more consistent is to make sure that the pizza ingredients are applied consistently to each of the pizzas. One way to reduce costs without reducing quality is to reduce the labor element by making it more productive. Yet more consistent pizza making often results in slower, and therefore less productive, pizza making. The present invention is provided to solve these and other problems.

SUMMARY OF THE INVENTION

It is an object of the invention to provide an apparatus for applying a flowable material, such as pizza sauce, onto an object, such as an awaiting pizza shell.

In accordance with the invention, the apparatus comprises a source of the flowable material having a source outlet port and a chamber having an chamber inlet port and a chamber outlet port. The apparatus further includes means, such as a piston and cylinder device communicatively disposed between the source outlet port and the chamber inlet port, for moving the flowable material from the source to the chamber. A flow control gate is disposed at the chamber outlet port and the apparatus includes means responsive to actuation of the moving means for opening the flow control gate.

It is contemplated that the opening means comprises an arm coupled to the piston.

It is further contemplated that the chamber outlet port includes means, such as a dispersing plate having a plurality of substantially uniformly arranged dispersing plate holes, for passing the flowable material in a substantially uniform pattern.

It is still further contemplated that the gate comprises means, such as a blocking plate disposed adjacent the dispersing plate and including a plurality of holes corresponding to each of the dispersing block holes and means for moving the blocking plate relative to the dispersing plate, for alternately blocking and unblocking each of the dispersing block holes.

Other features and advantages of the invention will be apparent from the following specification taken in conjunction with the following drawing.

BRIEF DESCRIPTION OF DRAWINGS

FIG. 5 is a downward view of the apparatus taken generally from line 5—5 of FIG. 4;

FIG. 6 is an enlarged view of the phantom area of FIG. 5 with the size control arm in one position;

FIG. 7 is an enlarged view of the phantom area of FIG. 5 with the size control arm in a second position.

DETAILED DESCRIPTION

Figure 1:
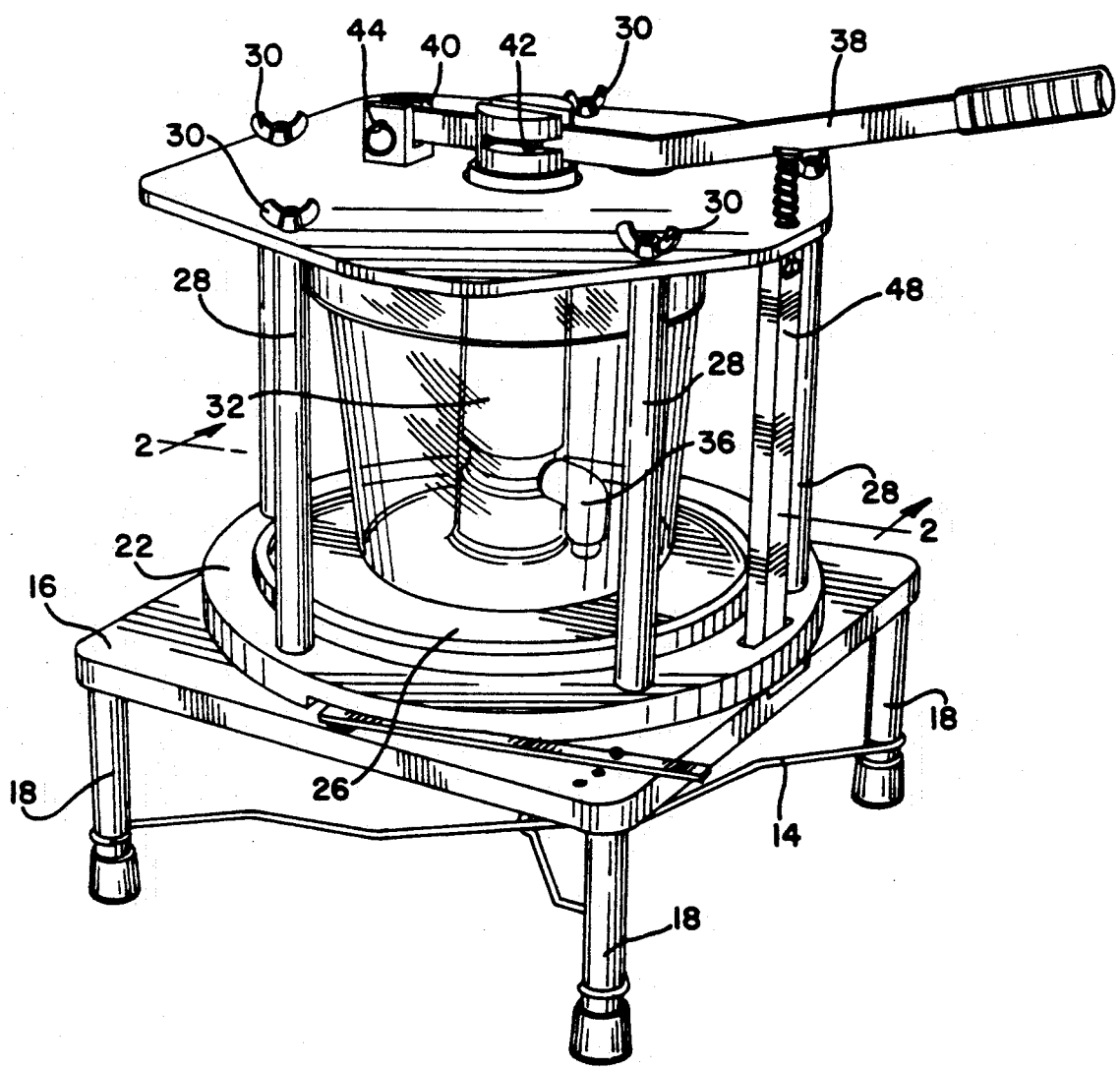
FIG. 1 is a perspective view of the apparatus according to the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

An apparatus 10 for applying a flowable material, such as pizza sauce, generally designated 12, onto an object, such as an awaiting pizza shell (not shown here) supported by a rack 14, is illustrated in FIG. 1.

The apparatus 10 comprises a base 16 supported by four legs 18, which themselves support the rack 14.

As discussed in greater detail below, the apparatus includes a dispersing plate 22 disposed above the base 16, a clear, plastic sauce container 24, and a cover plate 26. A top plate 27 is secured to the base 16 by five posts 28, and five corresponding wing nuts 30. A cylinder 32 containing a piston 34 is communicatively coupled to the sauce container 24 by a first port 36. The piston 34 is actuated within the cylinder 32 by a lever arm 38 pivotally mounted to the top plate 27 by a U-shaped bracket 40. As the apparatus 10 is intended for use in food preparation, ease of disassembly for cleaning has been provided. For example, the lever arm 38 is coupled to the piston 34 and the U-shaped bracket 40 by pins 42, 44, respectively.

As discussed below, when the lever arm 38 is moved upwardly, the sauce 12 is drawn from the container 24 into the cylinder 32. The amount of upward movement of the lever arm 38 determines the amount of the sauce 12 drawn. When the lever arm 38 is then moved downward, the sauce 12 in the cylinder 32 is forced into a chamber (shown later) formed by the cover plate 26 lifting away from the dispersing plate 22. Pressure within the chamber builds until the lever arm 38 actuates a spring loaded actuator arm 48, which in turn opens a gate (shown later), permitting the sauce 12 within the chamber to dispense as a circular pattern onto the waiting pizza. Causing the sauce to first fill the chamber under pressure causes the sauce to uniformly distribute within the chamber, so that when the gate opens, the sauce uniformly distributes onto the pizza.

As also discussed in greater detail below, the apparatus also includes a control arm 50, which controls the diameter of the circular pattern of applied sauce, as for example, for selectively applying sauce to small, medium and large pizzas.

Figure 2:
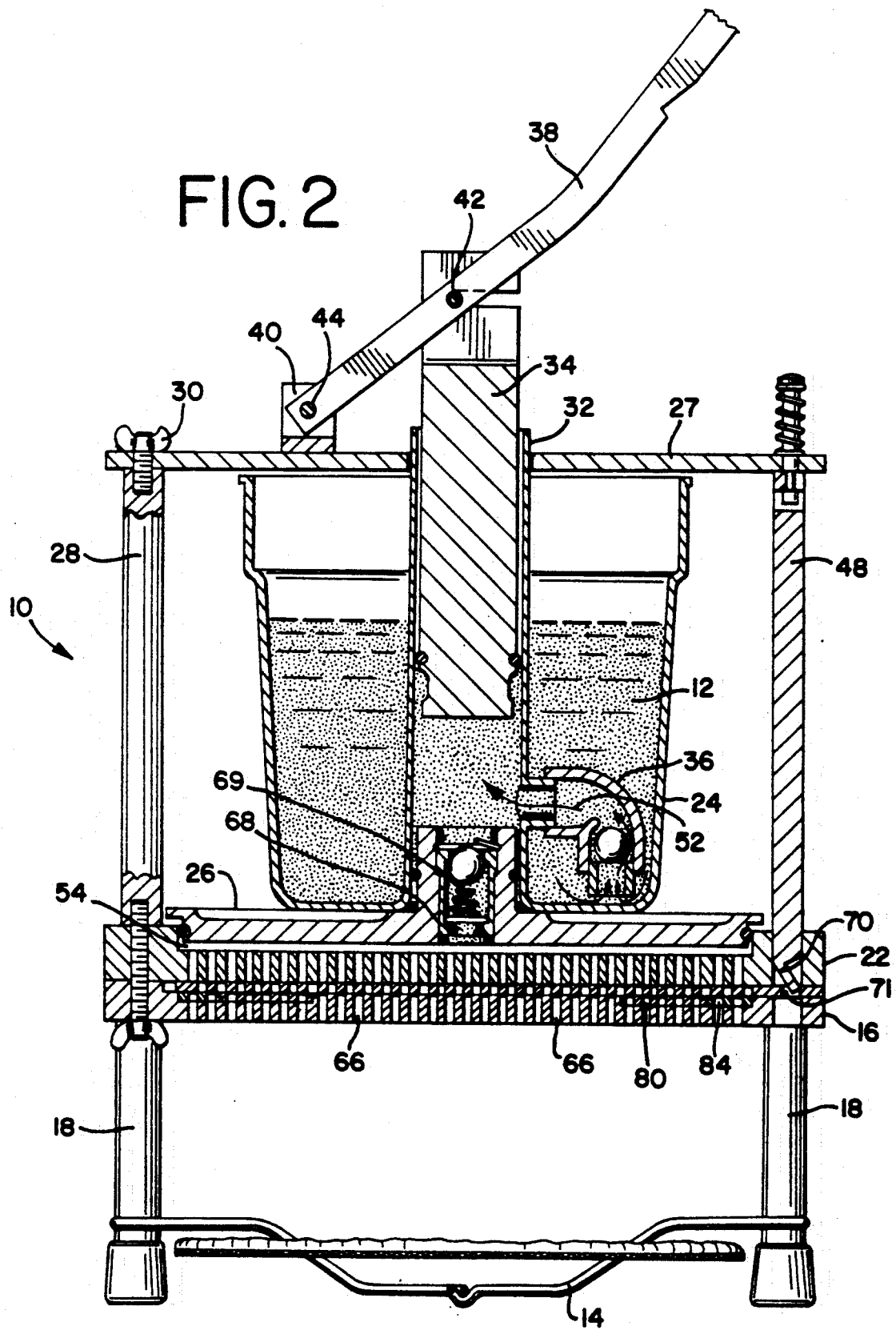
FIG. 2 is a section of the apparatus of FIG. 1 in the drawing position, taken along line 2—2 of FIG. 1.
Figure 3:
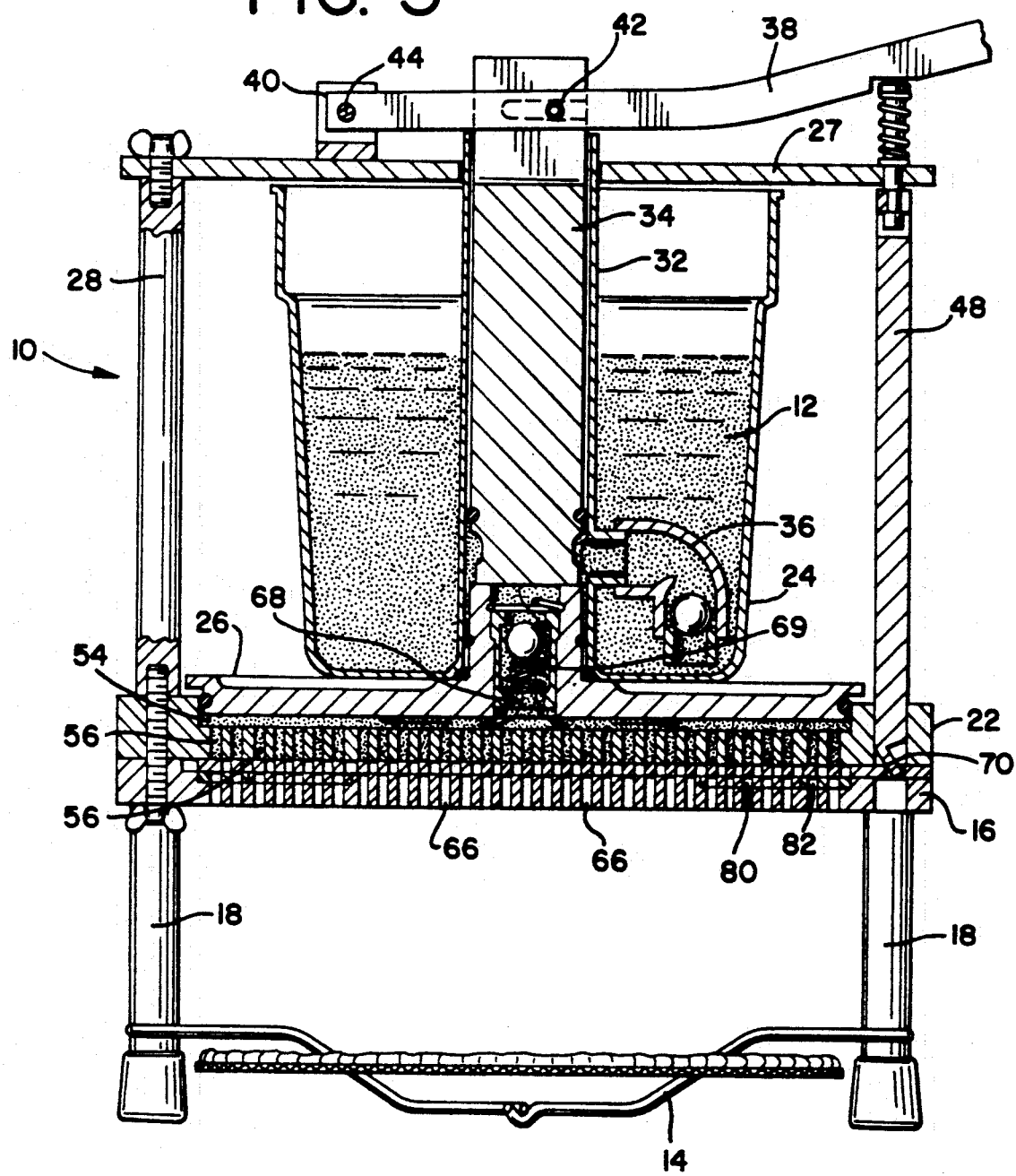
FIG. 3 is a section of the apparatus of FIG. 1 in the chamber filling position, taken along line 2—2 of FIG. 1.
Figure 4:
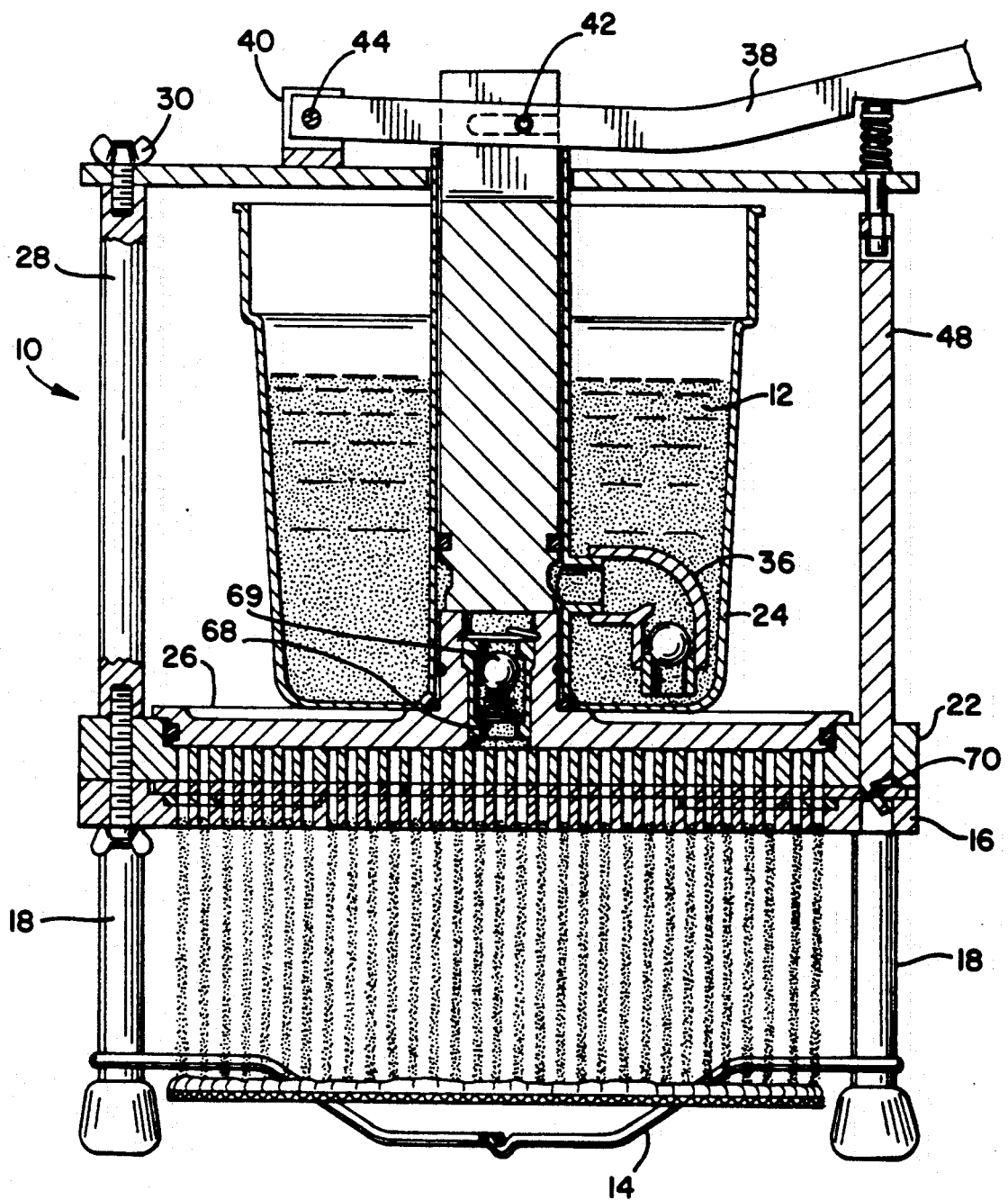
FIG. 4 is a section of the apparatus of FIG. 1 in the dispersing position, taken along line 2—2 of FIG. 1.

FIGS. 2, 3 and 4 are sections of the apparatus 10 taken along line 2—2 of FIG. 1, and will generally be discussed together.

In FIG. 2, the apparatus 10 is illustrated with the lever arm 38 in the upward position, having drawn the sauce 12 from the container 24 into the cylinder 32 via the first port 36, as shown by arrow 52.

In FIG. 3, the apparatus 10 is illustrated with the lever arm 38 in an intermediate position. As mentioned above, a chamber, shown here as 54, is formed as a space between the cover plate 26 and the dispersing plate 22. The dispersing plate 22 contains a plurality of dispersing holes 56, approximately 3/16" in diameter. The first port 36 includes a check valve 58 which only permits flow from the container 24 into the cylinder 32. When the lever arm 38 is moved from the upward position (of FIG. 2) to the intermediate position (of FIG. 3), the sauce 12 is forced from the cylinder 32, forcing the cover plate 26 away from the dispersing plate 22, forming chamber 54. A gate 60, comprising a blocking plate 62, is disposed below the dispersing plate 22. The blocking plate 62, shown in greater detail in FIG. 5, has a plurality of blocking holes 64. Each of the blocking holes 64 corresponds with a respective one of the dispersing holes 56. The gate 60 is movable between an open position, wherein each of the dispersing holes 56 is aligned with its corresponding one of the blocking holes 64, and a closed position wherein none of the dispersing holes 56 is aligned with any one of the blocking holes 64. The gate is shown in the closed position in FIGS. 2 and 3, and in the open position in FIG. 4. The base 16 includes a plurality of base holes 66, each of which aligns with a respective one of the dispersing holes 56.

Returning to FIG. 3, because the gate 60 is in the closed position, as the lever arm 38 is moved to the intermediate position from the upward position, the sauce 12 fills the chamber 54 via a second port 68. The second port 68 includes a second check valve 69 which only permits flow from the cylinder 32 to the chamber 54. Because the sauce 12 is blocked by the gate 60 from exiting the chamber 54, the sauce 12 builds under pressure, uniformly distributing itself throughout the chamber 54.

In FIG. 4, the apparatus 10 is illustrated with the lever arm 38 in a downward position. As mentioned above, the spring loaded actuator arm 48 opens the gate 60, permitting the sauce 12 within the chamber 54 to dispense as a circular pattern onto the waiting pizza. The actuator arm 48 is operated by the lever arm 38 as the lever arm 38 moves from the intermediate position to the downward position. Specifically, the actuator arm has a bevel 70, which fits into a slot 71 in the blocking plate 62. A spring 72 upwardly biases the actuator arm, so that the bevel 70 normally biases the gate 60 to the closed position. However when the lever arm 38 moves the actuator arm 48 downward, the bevel 70 slides the gate 60 to the open position, releasing the sauce 12 from the chamber 54, through the base holes 66, uniformly onto an awaiting pizza 72.

The blocking plate 62 and blocking holes are shown in greater detail in FIG. 5. The blocking plate 62 fits within a recess 76 in the base 16. The top surface of the blocking plate 62 is flush with the top surface of the base 16.

Figure 8:
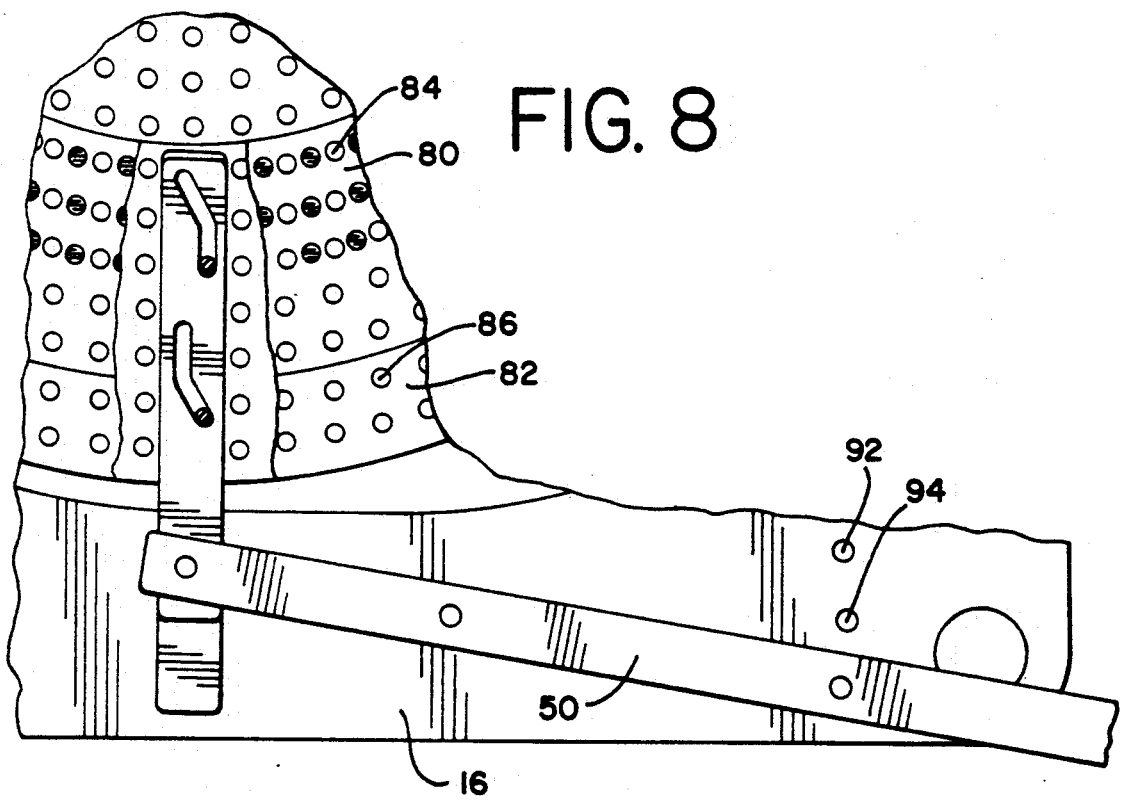
FIG. 8 is an enlarged view of the phantom area of FIG. 5 with the size control arm in a third position.

Referring to FIGS. 6, 7 and 8, first and second concentric rings 80, 82, are disposed between the blocking plate 64 and the base 16. The position the rings 80, 82, which are selectively rotatable by the control arm 50, determines the diameter of the pattern of sauce applied to the pizza 72. Each of the first and second rings 80, 82, includes a plurality of first and second ring holes 84, 86, respectively, which correspond to respective ones of the blocking holes 64 and the base holes 66.

As viewed in FIG. 6, the first and second rings 80, 82 are positioned such that none of the first and second ring holes 84, 86 are aligned with their respective ones of the blocking holes 64 and the base holes 66. Thus the sauce 12 will only be dispensed as a pattern equal in diameter to the inside diameter of the first ring 60, such as for a small pizza.

As viewed in FIG. 7, the first ring 80 is positioned such that the first ring holes 84 are aligned with their respective ones of the blocking holes 64 and the base holes 66, but the second ring 82 is positioned such that none of second ring holes 86 are aligned with their respective ones of the blocking holes 64 and the base holes 66. Thus the sauce 12 will be dispensed as a pattern equal in diameter to the inside diameter of the second, outer ring 62, such as for a medium pizza.

As viewed in FIG. 8, the first and second rings 80, 82 are positioned such that each of the first and second ring holes 84, 86 are aligned with their respective ones of the blocking holes 64 and the base holes 66. Thus the sauce 12 will be dispensed as a full pattern, such as for a large pizza.

Positioning holes 92, 94, 96 are provided to lock the control arm 50 in one of the three size positions.

Thus as has been shown, the apparatus 10 permits consistent and rapid application of pizza sauce, or other such flowable materials, to an awaiting object, such as a pizza. Further, the size of the pattern of sauce applied can readily and rapidly be changed.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

I claim:

1. An apparatus for applying a flowable material onto an object, comprising:
   a source of said flowable material having a source outlet port;
   a chamber having a chamber inlet port and a chamber outlet port;
   a piston and cylinder device having a first and second port, said first port coupled with said source outlet port, and said second port coupled with said chamber inlet port;
   means for actuating said piston and cylinder for moving said flowable material from said source to said chamber through said cylinder;
   a flow control gate disposed at said chamber outlet port; and
   means responsive to said actuating means for opening said flow control gate.

2. The apparatus of claim 1 wherein said opening means comprises an arm coupled to said piston.

3. The apparatus of claim 1 wherein said chamber outlet port includes means for passing said flowable material in a substantially uniform pattern.

4. The apparatus of claim 3 wherein said uniform passing means comprises a dispersing plate having a plurality of substantially uniformly arranged dispersing plate holes.

5. The apparatus of claim 4 wherein said gate comprises means for alternately blocking and unblocking each of said dispersing block holes.

6. The apparatus of claim 5 wherein said alternately blocking and unblocking means comprises:

a blocking plate disposed adjacent said dispersing plate and including a plurality of holes corresponding to each of said dispersing block holes; and means for moving said blocking plate relative to said dispersing plate.

7. The apparatus of claim 6 wherein said blocking plate moving means comprises an arm coupled to said flowable material moving means.

8. An apparatus for applying a flowable material onto an object, comprising:

a source of said flowable material having a source outlet port;

a chamber having a chamber inlet port and a chamber outlet port;

a piston and cylinder device having a first and second port, said first port coupled with said source outlet port and said second port coupled with said chamber inlet port, said device including first flow control means for preventing flow of said material from said cylinder to said source and second flow control means for preventing flow of said material from said chamber to said cylinder;

a flow control gate disposed at said chamber outlet port, said chamber outlet port including a dispersing plate having a plurality of substantially uniformly arranged dispersing plate holes and means for alternatively blocking and unblocking each of said dispersing plate holes;

means for actuating said piston and cylinder for moving said flowable material from said source to said chamber through said cylinder; and means responsive to said actuating means for opening said flow control gate.

9. The apparatus of claim 8 wherein said alternately blocking and unblocking means comprises:

a blocking plate disposed adjacent said dispersing plate and including a plurality of holes corresponding to each of said dispersing block holes; and means for moving said blocking plate relative to said dispersing plate.

10. The apparatus of claim 9 wherein said blocking plate moving means comprises an arm coupled to said piston.

11. An apparatus for applying pizza sauce onto a pizza shell, said apparatus comprising:

a source of said pizza sauce having a source outlet port;

a chamber having a chamber inlet port and a chamber outlet port;

a piston and cylinder device having a first and second port, said first port coupled with said source outlet port, and said second port coupled with said chamber inlet port, said device including a first check valve disposed between said cylinder and said source for preventing flow of said sauce from said cylinder to said source and a second check valve disposed between said cylinder and said chamber for preventing flow of said sauce material from said chamber to said cylinder;

means for supporting a pizza shell below said chamber;

a flow control gate disposed between said chamber and said pizza shell supporting means, said flow control gate including a dispersing plate having a plurality of substantially uniformly arranged dispersing plate holes and means for alternately blocking and unblocking each of said dispersing plate holes; means for actuating said piston and cylinder for moving said pizza sauce from said source to said chamber through said cylinder; and means responsive to said actuating means for opening said flow control gate.

12. The apparatus of claim 11 wherein said alternately blocking and unblocking means comprises:

a blocking plate disposed adjacent said dispersing plate and including a plurality of holes corresponding to each of said dispersing block holes; and means for moving said blocking plate relative to said dispersing plate between a first position wherein each of said dispersing plate holes aligns with a respective one of said blocking plate holes and a second position wherein each of said dispersing holes is blocked by said blocking plate.

13. The apparatus of claim 12 wherein said blocking plate moving means comprises an arm coupled to said piston.

14. The apparatus of claim 11 including means for selectively obstructing portions of said dispersing plate independent of said blocking plate.

15. The apparatus of claim 14 wherein:

said dispersing plate is circular; and said obstructing means is located subjacent a corresponding area of said dispersing plate, said obstructing means including a ring having a plurality of holes, each of said holes corresponding with each of said dispersing plate holes included in said corresponding area.

16. The apparatus of claim 15 including a plurality of radially spaced ones of said obstructing means.

17. An apparatus for applying a flowable material onto an object, comprising:

a source of said flowable material having a source outlet port;

a chamber having a chamber inlet port and a chamber outlet port;

a piston and cylinder device having a first and second port, said first port coupled with said source outlet port and said second port coupled with said chamber inlet port;

a flow control gate disposed at said chamber outlet port;

means for actuating said piston and cylinder for moving said flowable material from said source to said chamber through said cylinder;

means for building pressure upon said flowable material in said chamber; and means responsive to said actuating means for opening said flow control gate and allowing said pressurized flowable material to flow through said gate.

18. The apparatus of claim 17 wherein said opening means comprises an arm coupled to said piston.

19. The apparatus of claim 17 wherein said chamber outlet port includes means for passing said flowable material in a substantially uniform pattern.

20. The apparatus of claim 19 wherein said uniform passing means comprises a dispersing plate having a plurality of substantially uniformly arranged dispersing plate holes.

21. The apparatus of claim 20 wherein said gate comprises means for alternately blocking and unblocking each of said dispersing block holes.

22. The apparatus of claim 21 wherein said alternately blocking and unblocking means comprises:

a blocking plate disposed adjacent said dispersing plate and including a plurality of holes corresponding to each of said dispersing block holes; and means for moving said blocking plate relative to said dispersing plate.

23. The apparatus of claim 22 wherein said blocking plate moving means comprises an arm coupled to said flowable material moving means.

* * * * *